(12) United States Patent
Kayama et al.

(10) Patent No.: US 11,235,475 B2
(45) Date of Patent: Feb. 1, 2022

(54) ROBOTIC APPARATUS, INTERCHANGEABLE TOOL, AND METHOD FOR CONTROLLING ROBOTIC APPARATUS

(71) Applicant: CANON KABUSHIKI KAISHA, Tokyo (JP)

(72) Inventors: Naonori Kayama, Yokohama (JP); Yoshiyuki Miyazaki, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 15/922,590

(22) Filed: Mar. 15, 2018

(65) Prior Publication Data

US 2018/0272543 A1    Sep. 27, 2018

(30) Foreign Application Priority Data

Mar. 22, 2017 (JP) .................................. 2017-056239

(51) Int. Cl.
*B25J 15/04*     (2006.01)
*B25J 9/16*      (2006.01)
*B25J 15/00*     (2006.01)

(52) U.S. Cl.
CPC ......... *B25J 15/0475* (2013.01); *B25J 9/1682* (2013.01); *B25J 9/1687* (2013.01); *B25J 9/1694* (2013.01); *B25J 15/0004* (2013.01); *B25J 15/0416* (2013.01); *B25J 15/0433* (2013.01); *G05B 2219/40053* (2013.01); *G05B 2219/40583* (2013.01)

(58) Field of Classification Search
None
See application file for complete search history.

(56) References Cited

U.S. PATENT DOCUMENTS

| | | | | | |
|---|---|---|---|---|---|
| 1,519,248 | A | * | 12/1924 | Fox ....................... | B66C 1/0262 414/561 |
| 4,452,479 | A | * | 6/1984 | Terai .................... | B25J 15/0009 294/106 |
| 4,486,928 | A | * | 12/1984 | Tucker .................. | B23Q 7/046 29/26 A |
| 4,545,723 | A | * | 10/1985 | Clark ...................... | B25J 15/04 294/86.4 |
| 4,551,903 | A | * | 11/1985 | Bisiach ................ | B25J 15/0491 483/16 |
| 4,604,026 | A | * | 8/1986 | Barrett ................. | B65G 47/914 414/728 |
| 4,710,093 | A | * | 12/1987 | Zimmer ............... | B25J 15/0491 294/86.4 |

(Continued)

FOREIGN PATENT DOCUMENTS

| | | |
|---|---|---|
| JP | 69-115185 A | 7/1984 |
| JP | 2007-222971 A | 9/2007 |

(Continued)

*Primary Examiner* — Bhavesh V Amin
(74) *Attorney, Agent, or Firm* — Canon U.S.A., Inc. I.P. Division

(57) ABSTRACT

An interchangeable tool including a finger of a shape suitable for various components is mechanically detachably mounted to a robot arm. This eliminates the need for seeking the origin of the actuator for each interchange. By interchanging fingers themselves, the entire end effector can be reduced in size and weight.

32 Claims, 9 Drawing Sheets

(56) References Cited

U.S. PATENT DOCUMENTS

| | | | | |
|---|---|---|---|---|
| 4,758,122 A * | 7/1988 | Kubo | B23B 31/113 | 279/89 |
| 4,784,421 A * | 11/1988 | Alvite' | B25J 15/04 | 294/119.1 |
| 4,830,569 A * | 5/1989 | Jannborg | B25J 15/04 | 173/117 |
| 4,852,242 A * | 8/1989 | Tella | B23Q 3/15506 | 483/59 |
| 4,883,939 A * | 11/1989 | Sagi | B23K 9/287 | 219/125.1 |
| 4,913,617 A * | 4/1990 | Nicholson | B25J 9/0084 | 294/86.4 |
| 4,990,022 A * | 2/1991 | Watanabe | B25J 15/04 | 285/362 |
| 4,993,132 A * | 2/1991 | Manz | B25J 15/0491 | 279/8 |
| 5,010,228 A * | 4/1991 | Nishiwaki | H01R 13/631 | 219/86.25 |
| 5,044,063 A * | 9/1991 | Voellmer | B25J 15/0491 | 483/59 |
| 5,083,352 A * | 1/1992 | Nakako | B25J 15/04 | 29/57 |
| 5,110,239 A * | 5/1992 | Riley | B25B 11/005 | 144/144.1 |
| 5,243,264 A * | 9/1993 | Takada | B25J 15/04 | 318/568.11 |
| 5,256,128 A * | 10/1993 | Neumann | B23Q 1/0063 | 294/86.4 |
| 5,294,209 A * | 3/1994 | Naka | B23Q 1/0063 | 403/24 |
| 5,372,567 A * | 12/1994 | Whittington | B23Q 1/0009 | 219/86.8 |
| 5,837,901 A * | 11/1998 | Sola | G01B 5/0004 | 73/856 |
| 5,993,365 A * | 11/1999 | Stagnitto | B25J 15/0491 | 414/736 |
| 7,559,265 B2 * | 7/2009 | Mizuno | B25J 15/04 | 74/490.06 |
| 7,794,171 B2 * | 9/2010 | Park | B25J 9/026 | 403/353 |
| 8,025,277 B2 * | 9/2011 | Lin | B25J 15/0052 | 269/55 |
| 8,382,177 B2 * | 2/2013 | Rizk | B25J 15/0475 | 294/106 |
| 9,144,909 B2 * | 9/2015 | DeLouis | B25J 15/0408 | |
| 9,440,358 B2 * | 9/2016 | Setrakian | B25J 19/0029 | |
| 9,757,863 B2 * | 9/2017 | Suzuki | B25J 15/0475 | |
| 9,808,933 B2 * | 11/2017 | Lin | B25J 15/0616 | |
| 10,076,844 B2 * | 9/2018 | Rizk | B25J 15/04 | |
| 10,272,575 B2 * | 4/2019 | Pedersen | B23B 31/11 | |
| 10,500,735 B1 * | 12/2019 | Menon | B25J 15/0408 | |
| 2002/0056954 A1 * | 5/2002 | Schmalz | B23Q 1/26 | 269/21 |
| 2004/0012160 A1 * | 1/2004 | Krondorfer | B24D 9/085 | 279/9.1 |
| 2004/0103740 A1 * | 6/2004 | Townsend | B25J 9/1612 | 74/490.01 |
| 2006/0017237 A1 * | 1/2006 | Lin | B23Q 3/103 | 279/9.1 |
| 2007/0107917 A1 * | 5/2007 | Doherty | F41H 11/20 | 172/192 |
| 2007/0228670 A1 * | 10/2007 | Norton | B25J 15/04 | 279/2.11 |
| 2007/0293380 A1 * | 12/2007 | Kausch | B24B 45/006 | 483/31 |
| 2007/0299427 A1 * | 12/2007 | Yeung | B25J 9/104 | 606/1 |
| 2008/0073922 A1 * | 3/2008 | Holtz | B25J 15/0213 | 294/198 |
| 2009/0005907 A1 * | 1/2009 | Kronenberg | B08B 9/049 | 700/248 |
| 2009/0044655 A1 * | 2/2009 | DeLouis | B25J 15/045 | 74/490.05 |
| 2009/0088775 A1 * | 4/2009 | Swarup | A61B 34/30 | 606/130 |
| 2009/0139375 A1 * | 6/2009 | Hathaway | B23P 19/06 | 81/54 |
| 2009/0193642 A1 * | 8/2009 | Lin | B25J 15/0061 | 29/428 |
| 2009/0194922 A1 * | 8/2009 | Lin | B25J 15/0052 | 269/55 |
| 2010/0095799 A1 * | 4/2010 | Albin | B25J 15/0213 | 74/490.01 |
| 2012/0007375 A1 * | 1/2012 | Vittor | B25J 15/02 | 294/192 |
| 2012/0207538 A1 * | 8/2012 | Rizk | B25J 15/0491 | 403/315 |
| 2012/0299322 A1 * | 11/2012 | White | B25J 15/0475 | 294/213 |
| 2013/0313791 A1 * | 11/2013 | Setrakian | B25J 15/0019 | 279/143 |
| 2016/0059423 A1 * | 3/2016 | Pedersen | B23B 31/113 | 74/490.05 |
| 2016/0221196 A1 * | 8/2016 | Suzuki | B25J 15/0425 | |
| 2019/0111575 A1 * | 4/2019 | Asano | B25J 15/0066 | |
| 2019/0210230 A1 * | 7/2019 | Pedersen | F16B 21/04 | |

FOREIGN PATENT DOCUMENTS

| | | | |
|---|---|---|---|
| JP | 2009-184099 A | 8/2009 | |
| JP | 5892765 A | 3/2016 | |

\* cited by examiner

FIG. 5
FIG. 6
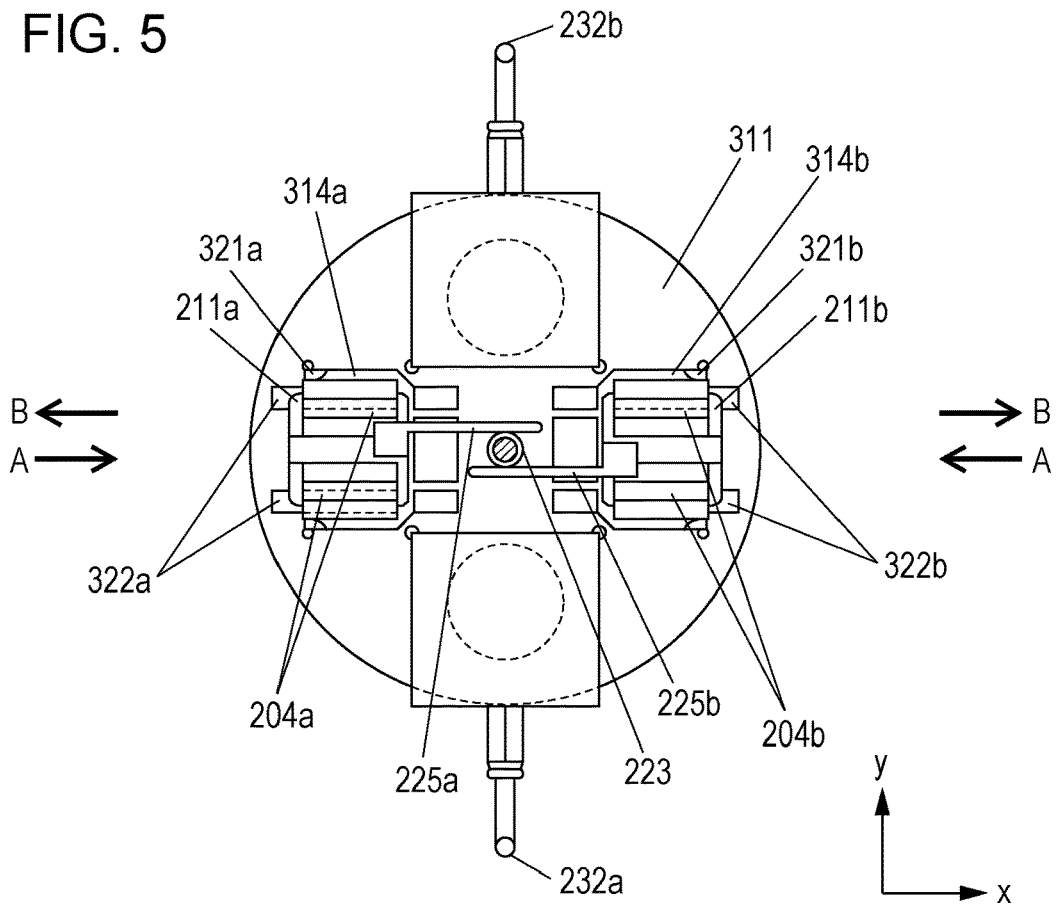
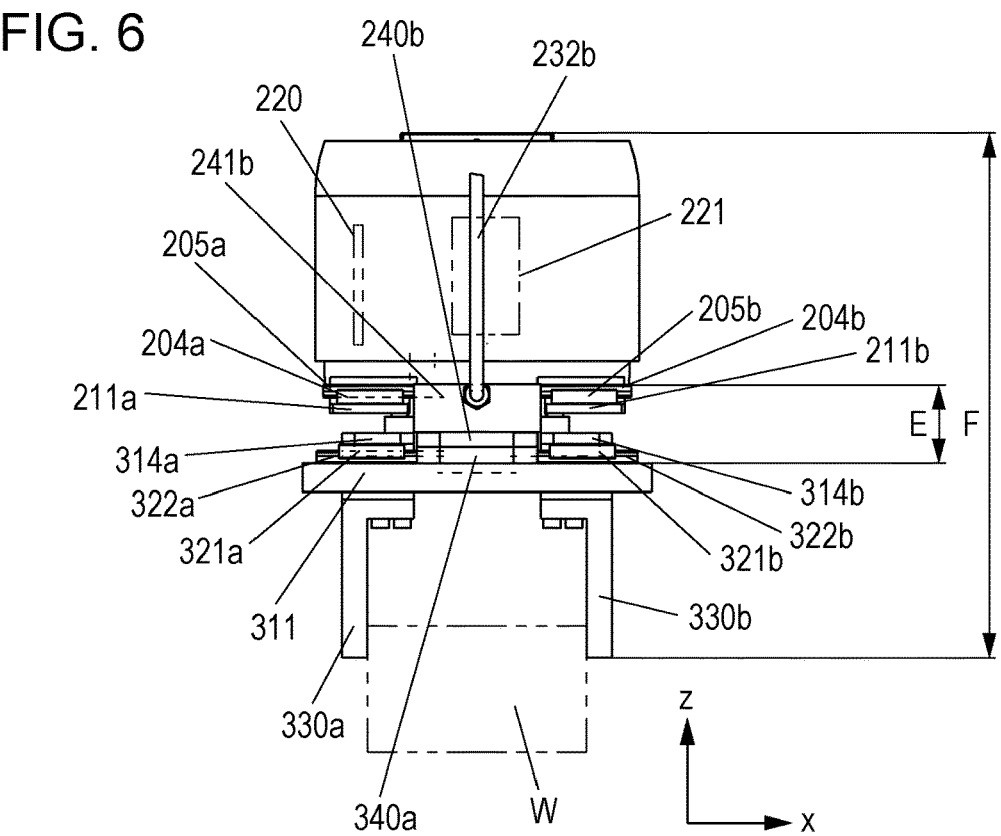

ROBOTIC APPARATUS, INTERCHANGEABLE TOOL, AND METHOD FOR CONTROLLING ROBOTIC APPARATUS

BACKGROUND

Field of the Disclosure

The present disclosure generally relates to a robotic apparatus in which an operating unit for operating an object is interchangeable and to a method for controlling the robotic apparatus.

Description of the Related Art

Automation of work such as assembly and processing of industrial products having a compact and complicated structure, such as cameras and printers, has been recently performed. Parts for use for this type of industrial product are often small precision parts and vary in shape.

Meanwhile, continuous production of a variety of products using the identical robotic apparatus is required. Therefore, at the manufacturing site, changing the setup including interchanging of the end effector and the tools of the robotic apparatus is required according to the kind of workpiece and process change. In the case where the configuration of this kind of robotic apparatus is manually changed by an operator, much labor and time is required. For this reason, there is an increasing demand for automatic setup change, in which setup change is performed by programming the robotic apparatus as much as possible.

In view of the above circumstances, the robotic apparatus is required to have a compact and simple configuration, specifications and performance that allow gripping, assembling, and processing various kinds of workpieces. At the same time, it is desired to increase the operation rate of the entire robotic apparatus by automatically interchanging tools for work, such as gripping, assembling, and machining of workpieces, without the need for work or assistance of workers to perform an automatic setup change with a minimum change of the apparatus configuration.

For automatic interchanging of an operating unit of the robotic apparatus, such as tools or the components thereof, reduction in the size and weight of the tools, reduction of a interchanging time of the tools and the components, and an increase in the mounting accuracy of interchanging are required. The tools include various devices, such as a hand for gripping and conveying a workpiece, a spray gun for painting, and a welding machine, which are interchangeable with respect to a robot arm according to the workpiece or the process.

Some tools like hands are configured so that finger portions that handle the workpiece are interchangeable. Particularly to interchange the finger portions of the hand, the structures disclosed in Japanese Patent Application No. 2006-44630 and Japanese Patent No. 5892765 have been proposed.

For example, a robot hand disclosed in Japanese Patent Application No. 2006-44630 includes a common base, which is a hand main body mounted to a robot arm, and a finger unit detachably mounted to the common base and including a plurality of fingers. In mounting the finger unit to the common base, the finger unit is placed on a predetermined jig, and the robot arm is moved close to the finger unit from above. A pair of locating pins projecting from the upper end of the finger unit is fit in a pair of locating holes formed at the lower end of the common base, and lock pins are engaged with the locating pins, so that the finger unit is mounted to the common base.

A robot hand disclosed in Japanese Patent No. 5892765 includes an interchangeable claw module that is detachably mounted to a robot arm including finger members. The interchangeable claw module includes claw members, claw support members including the claw members and insertion holes in which the finger members of the robot hand can be inserted, guide mechanism that guide the claw members in a corresponding opening and closing direction of the finger members, and a frame member that supports the claw members via the guide mechanisms. The claw members of the interchangeable claw module are gripped with the finger members of the robot hand to support the interchangeable claw module and the driving force of the finger members is transmitted to the claw members to move the claw members.

In the robot hand disclosed in Japanese Patent Application No. 2006-44630, each finger unit includes an opening and closing driving source for opening and closing the plurality of finger members, so that the manufacturing cost is high. Furthermore, it is necessary to seek the origin of the actuator for each interchanging. This increases the interchanging time and decreases the working efficiency.

The robot hand disclosed in Japanese Patent No. 5892765 is configured to support the interchangeable claw module with the finger members of the robot hand and to grip a workpiece by moving the claw members. This has the problem of increasing the size and weight of the entire end effector including the robot hand and the interchangeable claw module. The increase in the size and weight of the entire end effector can cause an increase in the vibration of the distal end of the end effector and decrease the accuracy of positioning for gripping the workpiece.

What is needed is a robotic apparatus in which tools can be interchanged without the need for seeking the origin caused by driving due to an electrical detaching mechanism and in which the distal end of the robot arm is reduced in size and weight.

SUMMARY

Aspects of the present disclosure provide a robotic apparatus including a robot arm and configured to grip an object using an interchangeable tool that is detachable to the robot arm. The interchangeable tool includes a finger that comes into contact with the object. The robotic apparatus includes a robot-arm-side mount surface to which the interchangeable tool is mounted and an interchangeable-tool-side mount surface to be mounted to the robot arm. The robot-arm-side mount surface includes a robot-arm-side fixing portion configured to hold the interchangeable tool in a mounted state and a driving mechanism for driving the finger in the mounted state. The interchangeable-tool-side mount surface includes an interchangeable-tool-side fixing portion to be engaged with the robot-arm-side fixing portion and an opening and closing mechanism that is connected to the driving mechanism in the mounted state. The opening and closing mechanism is activated in conjunction with the driving mechanism.

Further features of the present disclosure will become apparent from the following description of exemplary embodiments with reference to the attached drawings.

BRIEF DESCRIPTION OF THE DRAWINGS

FIG. 5 is a perspective view of a cross-sectional view taken along a mount surface VS in FIG. 4 viewed from a tool member.

FIG. 6 is a diagram illustrating a state in which a driving module in an embodiment of the present disclosure and an interchangeable tool module are connected, so that driving transmission pins are fit in driving transmission holes.

DESCRIPTION OF THE EMBODIMENTS

Embodiments of the present disclosure will be described with reference to the attached drawings. The embodiments below are given for mere illustration, and the configuration of the details can be appropriately changed by those skilled in the art without departing from the spirit of the present disclosure.

Figure 1:
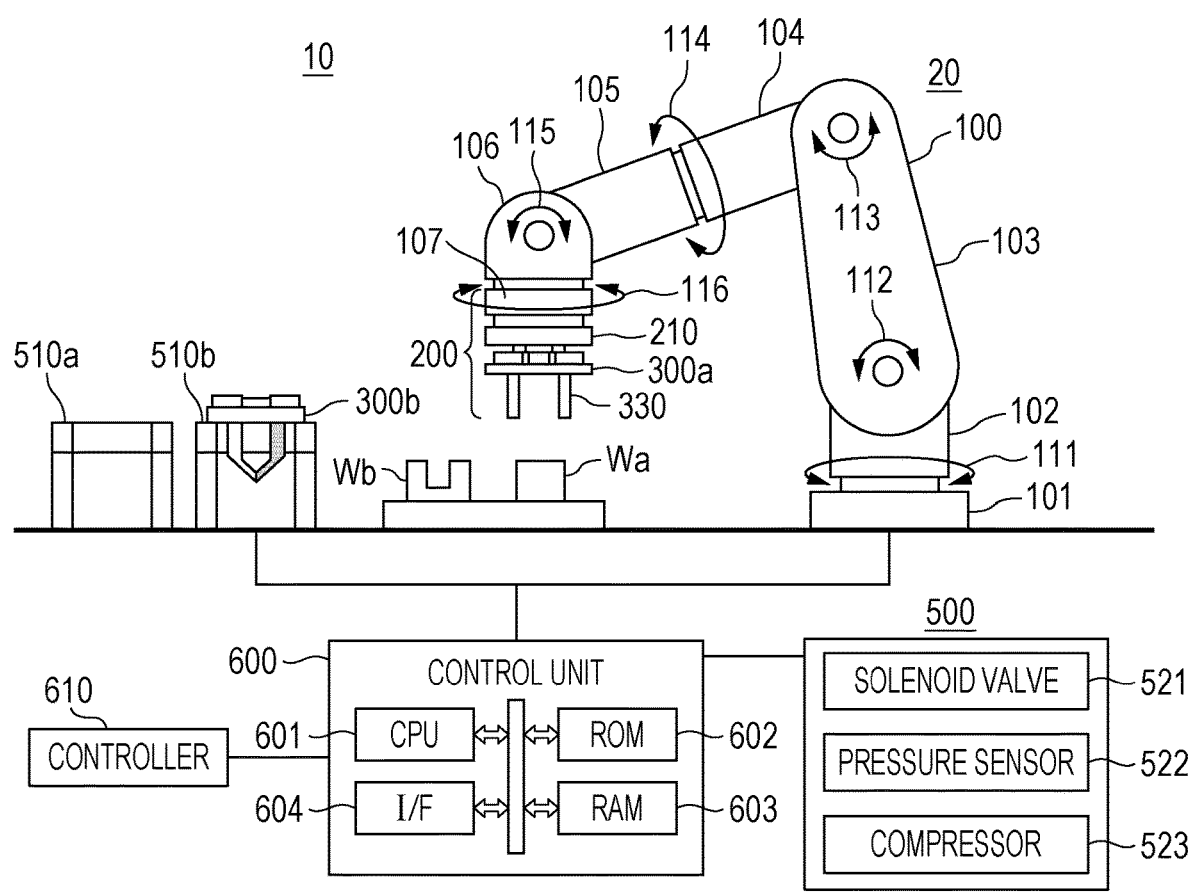
FIG. 1 is an explanatory diagram illustrating an example of the schematic configuration of a robot system according to an embodiment of the present disclosure.
Figure 2:
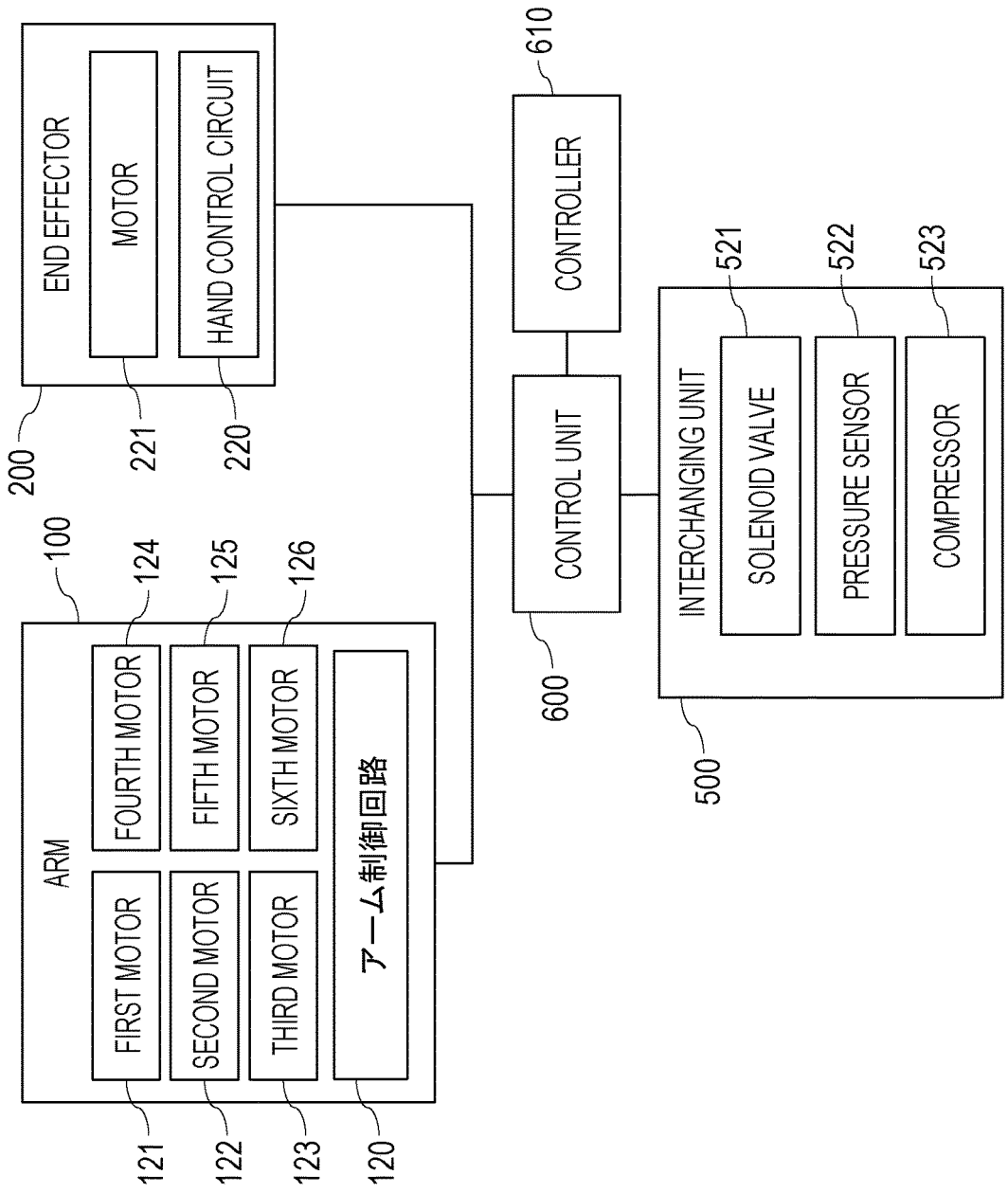
FIG. 2 is a block diagram illustrating the structure of a control system of the robot system in FIG. 1.

FIGS. 1 and 2 illustrate an example of the configuration of a robot system according to an embodiment of the present disclosure. FIG. 1 is an explanatory diagram illustrating an example of the schematic configuration of a robot system 10 according to an embodiment of the present disclosure. In FIG. 1, the robot system 10 includes a robotic apparatus 20, an interchanging unit 500, and a control unit 600 and a controller 610 for controlling the robotic apparatus 20 and the interchanging unit 500. The control unit 600 and the controller 610 are illustrated as a block diagram at the lower part of FIG. 1.

FIG. 2 illustrates the structure of a control system including the control unit 600 and the controller 610.

The robotic apparatus 20 in FIG. 1 is capable of operation on a workpiece W (Wa and Wb) to be operated using an end effector 200, which is a distal end of a robot arm 100, and an interchangeable tool 300a disposed on the end effector 200. The interchangeable tool 300a is detachably mounted to a robot-arm-side mount surface 210 of the end effector 200.

The robot arm 100 includes seven links 101 to 107 and six joints 111 to 116 that connect the links 101 to 107 together so as to swing and rotate. Although the links 101 to 107 of the present embodiment have fixed lengths, links that can be extended by, for example, linear actuators, may be used.

Referring to FIG. 1, the interchangeable tool 300a is mounted to the endmost link 107 of the robot arm 100. The interchangeable tool 300a supported by the link 107 can be changed in the degree of freedom of at least one of the position and the posture by the operation of the robot arm 100. The interchangeable tool 300a is detachably mounted to the robot-arm-side mount surface 210 and can be interchanged with another interchangeable tool 300b. Work (operation) on the workpiece W can be performed by combining control of the position and posture of the robot arm 100 and the posture of the interchangeable tool 300a and the opening and closing motion of a finger member 330.

Consider the interchangeable tools 300a and 300b as operating units that can be mounted to and detached from the robot-arm-side mount surface 210. For example, in the state illustrated in FIG. 1, the first interchangeable tool 300a is mounted on the robot-arm-side mount surface 210. By executing the operation described below, the first interchangeable tool 300a can be interchanged with the second interchangeable tool 300b. In the state in FIG. 1, the second interchangeable tool 300b is held by a tool stocker 510b illustrated on the left in FIG. 1. Hereinafter, the interchangeable tools 300a and 300b are sometimes referred to as generic name, interchangeable tool 300.

In the case where the shapes of the workpieces W of the product to be assembled and work thereon vary, the workpiece W to be gripped and assembled differ, so that the interchangeable tool 300 is selectively used according to the workpiece W and the work. For example, first, second, third . . . interchangeable tools 300 including finger members 330 having different lengths and shapes are prepared in advance and are interchanged according to the workpiece W or the work, so that a finger member optimal for the workpiece W and the work can be used.

The "operating unit" detachably mounted to the robot-arm-side mount surface 210 is not limited to the gripping "fingers". Examples of work tools other than fingers include drivers, drills, and welding machines. Not only the fingers, any tools having a mechanism for interchanging the operating unit, described later, can be mounted. The number of tools to be driven may be increased according to the operation.

The control unit 600 serving as a control unit for the robot system 10 may be a computer using a microprocessor element or the like. This control unit 600 allows the robotic apparatus 20 and the interchanging unit 500 to be controlled.

The computer constituting the control unit 600 includes a CPU 601, a ROM 602 that stores programs for controlling the components, a RAM 603, and a communication interface 604. Among them, the RAM 603 is used to temporarily store data, such as a teaching point and a control instruction, from the controller 610.

An example of the controller 610 is an operating unit, such as a teaching pendant. Alternatively, the controller 610 may be another computer capable of editing robot programs. The controller 610 can be connected to the control unit 600 via a wired or wireless communication connecting unit and has a user interface function, such as robot operation and state display.

The CPU 601 receives, for example, teaching point data input from the controller 610, via the communication interface 604. The CPU 601 can generate the paths of the axes of the robotic apparatus 20 on the basis of the teaching point data input from the controller 610 and can transmit the paths to the robotic apparatus 20 as control target values via the communication interface 604.

Next, an example of a configuration for mounting and detaching the interchangeable tool 300 serving as an operating unit in the present embodiment will be described. In the present embodiment, the finger member 330 includes a pair of finger members, and therefore a configuration for mounting and detaching the interchangeable tool 300 including the two finger members will be described.

Figure 3:
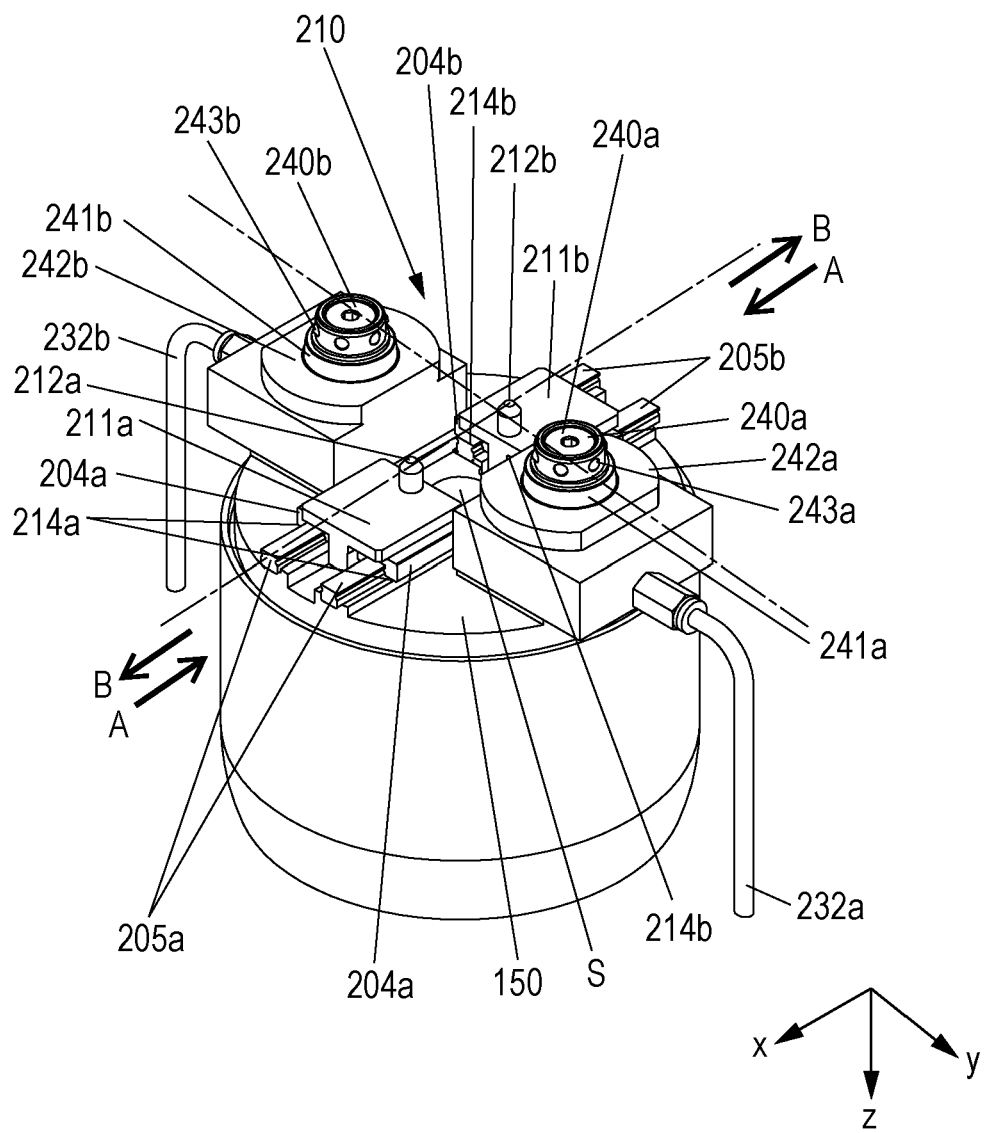
FIG. 3 is a perspective view of a driving module in an embodiment of the present disclosure.

FIG. 3 is a perspective view of the robot-arm-side mount surface 210 of the present embodiment viewed from above. A driving mechanism for mounting and detaching the interchangeable tool 300 and transmitting a driving force is provided on a base 150 of the robot-arm-side mount surface 210.

The driving mechanism includes a pair of drive bases 211a and 211b. The drive bases 211a and 211b can be moved linearly by a slide guide including guide blocks 204a and 204b and guide rails 205a and 205b.

The drive bases 211a and 211b are respectively fixed to two horizontal sides 214a and 214b with the guide blocks 204a and 204b and screws.

Driving transmission members 212a and 212b are respectively disposed on the drive bases 211a and 211b. Racks 225a and 225b (see FIG. 5) are respectively disposed under the drive bases 211a and 211b.

Figure 4:
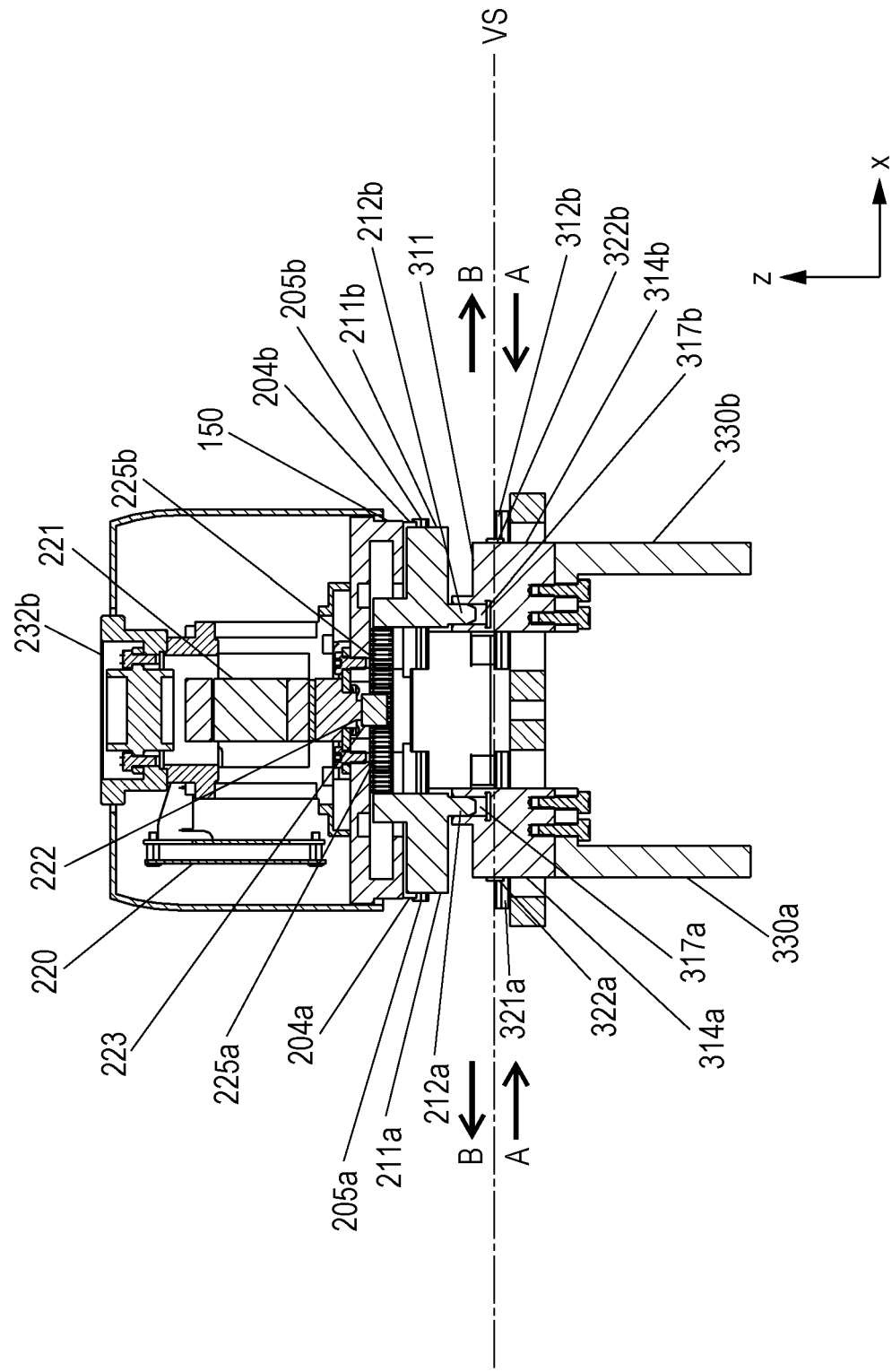
FIG. 4 is a perspective view illustrating a state in which an interchangeable tool module is mounted to a driving module in an embodiment of the present disclosure.

FIG. 4 is a perspective view illustrating a state in which the interchangeable tool 300 is mounted on the robot-arm-side mount surface 210. In FIG. 4, a motor 221 for driving the driving mechanism is disposed in the interior of the distal end of the robot arm 100. A pinion gear 223 is disposed at an end of a pinion shaft 222 corresponding to the drive shaft of the motor 221.

FIG. 5 is a perspective view of a cross-sectional view taken along a mount surface VS in FIG. 4 viewed from the tool member. In FIG. 5, the racks 225a and 225b engage the pinion gear 223 from above and below in FIG. 5. The forward and reverse rotation of the pinion gear 223 causes the racks 225a and 225b to slide in the directions of arrows A and B. In other words, when the pinion gear 223 rotates clockwise, the racks 225a and 225b come close to each other in the direction of arrow A, and when the pinion gear 223 rotates counterclockwise, the racks 225a and 225b come away from each other in the direction of arrow B. The racks 225a and 225b are respectively connected to the drive bases 211a and 211b and are capable of moving the drive bases 211a and 211b in the directions of arrows A and B along the guide rails 205a and 205b by sliding in the directions of arrows A and B. The allows the positions of the driving transmission members 212a and 212b to be controlled.

Next, a robot-arm-side fixing portion will be described. Referring back to FIG. 3, the robot-arm-side fixing portion includes two locator pins 240a and 240b. The pair of locator pins 240a and 240b, the pair of drive bases 211a and 211b, and the driving transmission members 212a and 212b on the drive bases 211a and 211b are alternately disposed in a circle around the axial center S of the end effector 200. The locator pins 240a and 240b and the drive bases 211a and 211b are disposed so that a straight line connecting the centers of the locator pins 240a and 240b and a straight line connecting the centers of the drive bases 211a and 211b are substantially perpendicular to each other.

The locator pins 240a and 240b respectively include fitting shafts 241a and 241b and contact portions 242a and 242b and have, at their ends, balls 243a and 243b movable toward the center. The balls 243a and 243b can be respectively moved forward and backward with respect to the peripheral surfaces of the locator pins 240a and 240b by supplying or exhausting compressed air to or from the locator pins 240a and 240b.

FIG. 6 is a diagram illustrating a state in which the interchangeable tool 300 is mounted, and the driving transmission members 212a and 212b are respectively fit in driving transmission holes 317a and 317b. As illustrated in FIGS. 4 and 6, the locator pins 240a and 240b respectively include air paths 232a and 232b. The locator pins 240a and 240b are connected a solenoid valve 521 illustrated in FIG. 1 through the air paths 232a and 232b, respectively. The balls 243a and 243b can be moved toward the center by switching between intake and exhaust of compressed air from a compressor 523 illustrated in FIG. 1 through the air paths 232a and 232b by controlling the solenoid valve 521.

The compressed air is supplied to the locator pins 240a and 240b in a state in which the locator pins 240a and 240b are respectively fit in stepped fitting holes 340a and 340b (see FIG. 6) provided at the interchangeable tool 300, to be described later. When the balls 243a and 243b move radially outward, the balls 243a and 243b engage with engaging portions 343a and 343b of the stepped fitting holes 340a and 340b to bring the locator pins 240a and 240b and the stepped fitting holes 340a and 340b into a mechanically engaged state. In contrast, when the balls 243a and 243b move radially inward, the engagement between the balls 243a and 243b and the engaging portions 343a and 343b is released to bring the locator pins 240a and 240b and the stepped fitting holes 340a and 340b into a separable state. The locator pins 240a and 240b and the stepped fitting holes 340a and 340b have s ball plunger configuration.

Figure 7:
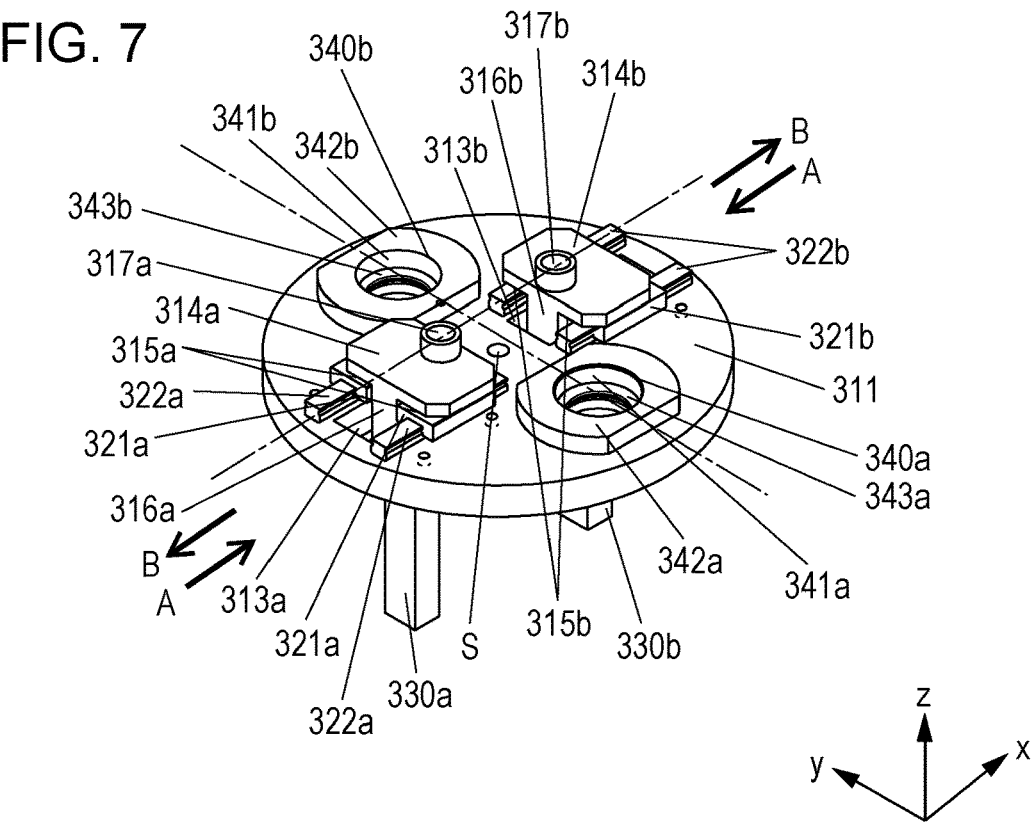
FIG. 7 is a perspective view of an interchangeable tool module in an embodiment of the present disclosure viewed from above.

Referring next to FIG. 7, the interchangeable tool 300 will be described. FIG. 7 is a perspective view of the interchangeable tool 300. The interchangeable tool 300 includes an interchangeable-tool-side mount surface 311 and two finger support members 314a and 314b which are disposed in parallel on a straight line on the upper surface of the interchangeable-tool-side mount surface 311 and which function as an opening and closing mechanism. Finger members 330a and 330b are respectively disposed at the lower ends of the two finger support members 314a and 314b. The interchangeable tool 300 further includes guide rails 322a and 322b and guide blocks 321a and 321b serving as a guide mechanism for guiding the finger support members 314a and 314b to move parallel to each other.

First, the robot-arm-side mount surface 311 will be described. The interchangeable-tool-side mount surface 311 has a circular shape around the axial center S of the robot arm 100. The interchangeable-tool-side mount surface 311 includes the two finger support members 314a and 314b that respectively support the finger members 330a and 330b and fitting portions 341a and 341b.

The interchangeable-tool-side mount surface 311 has two openings 313a and 313b. The finger support members 314a and 314b are respectively arranged so that the finger members 330a and 330b pass through the openings 313a and 313b. The guide rails 322a and 322b are arranged, with the openings 313a and 313b therebetween, respectively. The finger support members 314a and 314b are respectively fixed to two sets of horizontal sides 315a and 315b with the guide blocks 321a and 321b and screws. The guide blocks 321a and 321b can be moved along the guide rails 322a and 322b, so that the finger support members 314a and 314b serve as an opening and closing mechanism for opening and closing the finger members 330a and 330b.

The two stepped fitting holes 340a and 340b, the two finger support members 314a and 314b, and the driving transmission holes 317a and 317b on the interchangeable-tool-side mount surface 311 are disposed in a circle around the axial center S. The stepped fitting holes 340a and 340b and the finger support members 314a and 314b are arranged such a straight line connecting the centers of the stepped fitting holes 340a and 340b and a straight line connecting the finger support members 314a and 314b are substantially perpendicular to each other.

The stepped fitting holes 340a and 340b respectively have the fitting portions 341a and 341b, contact portions 342a and 342b, and engaging portions 343a and 343b. The locator pins 240a and 240b are respectively inserted into the stepped fitting holes 340a and 340b, so that the fitting portions 341a and 341b and the fitting shafts 241a and 241b are fit each other. When the balls 243a and 243b move radially outward, the balls 243a and 243b respectively engage the engaging portions 343a and 343b and are urged diagonally upward. Furthermore, the contact portions 342a and 342b of the stepped fitting holes 340a and 340b and the contact portions 242a and 242b of the locator pins 240a and 240b are brought into close contact with each other, so that the locator pins 240a and 240b and the stepped fitting holes 340a and 340b are positioned into a mechanically connected state. In other words, the interchangeable tool 300 is mounted to the robot arm 100.

In contrast, when the balls 243a and 243b move radially inward, the engagement between the balls 243a and 243b and the engaging portions 343a and 343b is released, so that the locator pins 240a and 240b and the stepped fitting holes 340a and 340b become separable.

The interchangeable-tool-side mount surface 311 corresponds to the substantial mount surface of the interchangeable tool 300 and has prepared holes for a plurality of screws and locating holes so that any tool can be mounted.

Next, the pair of finger support members 314a and 314b will be described in detail. Referring to FIG. 7, the respective horizontal sides 315a and 315b of the finger support members 314a and 314b are respectively fixed to the guide blocks 321a and 321b with screws. Vertical sides 316a and 316b are respectively disposed in the openings 313a and 313b and pass through the interchangeable-tool-side mount surface 311 and protrude from the lower surface.

Referring back to FIGS. 4 and 6, driving transmission holes 317a and 317b are respectively disposed at the top of the finger support members 314a and 314b. In a state in which the interchangeable tool 300 is joined to the robot arm 100, the driving transmission members 212a and 212b are respectively fit in the driving transmission holes 317a and 317b, as illustrated in FIG. 4. Thus, the driving of the drive bases 211a and 211b is transmitted to the finger support members 314a and 314b, respectively.

When the drive bases 211a and 211b are brought close to each other in the direction of arrow A in FIG. 4 or away from each other in the direction of arrow B, the driving force is transmitted to the finger support members 314a and 314b via the driving transmission members 212a and 212b. This allows the finger support members 314a and 314b to come close to each other in the direction of arrow A or away from each other in the direction of arrow B in the openings 313a and 313b, respectively. Thus, controlling the positions of the drive bases 211a and 211b allows controlling the positions of the finger support members 314a and 314b.

Next, the finger members 330a and 330b will be described. As illustrated in FIG. 4, the finger members 330a and 330b are respectively fixed to the finger support members 314a and 314b. Therefore, when the finger support members 314a and 314b are driven by the driving force transmitted from the driving transmission members 212a and 212b, the finger members 330a and 330b are linearly driven to come close to each other in the direction of arrow A and away from each other in the direction of arrow B.

The finger members 330a and 330b are respectively integrated with the finger support members 314a and 314b.

The finger support members 314a and 314b are respectively fixed to the guide blocks 321a and 321b with screws.

In FIG. 4, the pair of drive bases 211a and 211b are driven in the direction of arrow A, so that the pair of finger support members 314a and 314b are respectively driven via the driving transmission members 212a and 212b and the driving transmission holes 317a and 317b. As a result, the pair of finger members 330a and 330b move in the direction of arrow A into contact with the workpiece W, thereby gripping the workpiece W.

In contrast, by driving the drive bases 211a and 211b in the direction of arrow B, the pair of finger support members 314a and 314b are respectively driven via the driving transmission members 212a and 212b and the driving transmission holes 317a and 317b. As a result, the pair of finger members 330a and 330b move in the direction of arrow B to release the gripping of the workpiece W.

In the present embodiment, considerations are made to facilitate an operation for attaching and detaching various interchangeable tools 300 according to work and designing new interchangeable tools.

In other words, in a state in which the interchangeable tool 300 is mounted to the robot arm 100, as illustrated in FIG. 4, a mechanism for attaching and detaching the interchangeable tool 300 and a mechanism for transmitting driving are positioned on the mount surface VS. This mount surface VS is defined as a typical example of a mount surface including the robot-arm-side mount surface 210 and the interchangeable-tool-side mount surface 311.

Defining the typical mount surface makes it easy to standardize the arrangement of the attaching and detaching mechanism and the driving transmission system also when developing a new interchangeable tool, allowing providing a highly versatile robotic apparatus.

The shape of the finger member 330 is given for illustration, and various shapes can be employed according to the shape or posture of the workpiece to be gripped.

Next, tool stockers 510a and 510b in which the interchangeable tool 300 of the present disclosure removed from the robot-arm-side mount surface 210 is stored will be described. Hereinafter, the tool stockers 510a and 510b are sometimes referred to as "tool stocker 510" as a generic name of all tool stockers.

Figure 8:
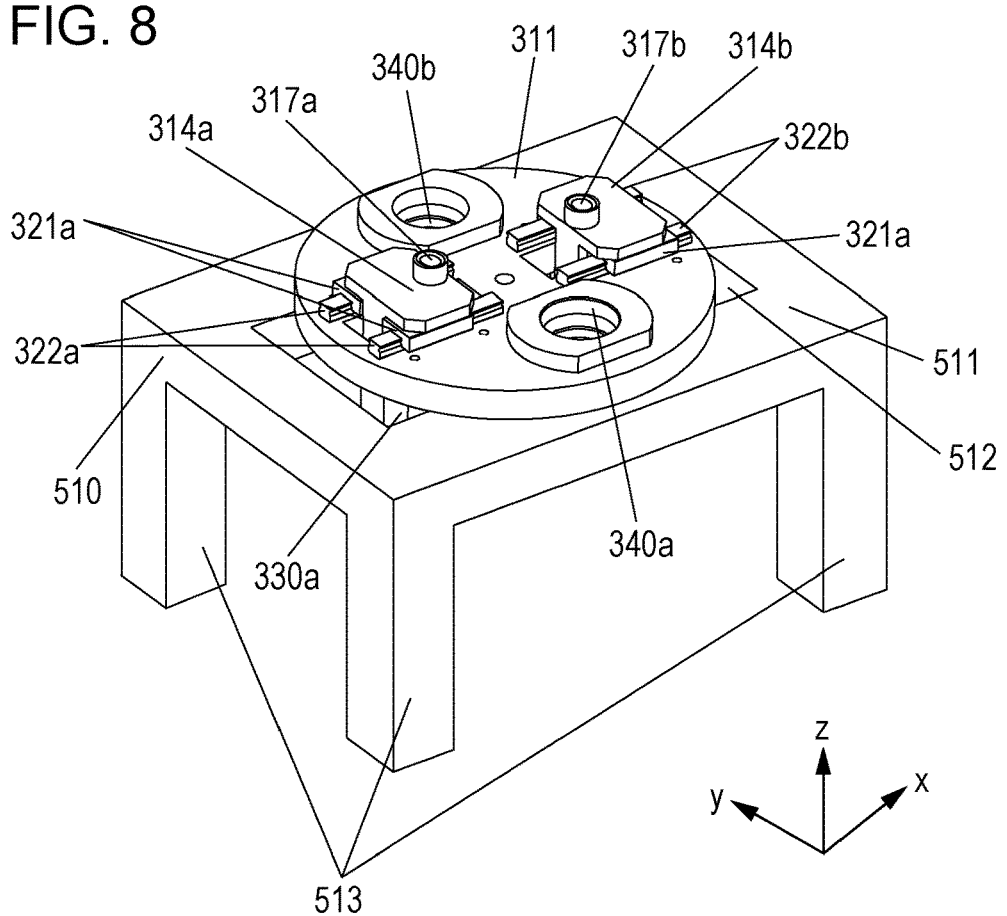
FIG. 8 is a perspective view of an interchangeable-tool-module storage in an embodiment of the present disclosure.

FIG. 8 is a perspective view of the tool stocker 510 in the present embodiment. The tool stocker 510 illustrated in FIG. 8 includes a grounding portion 511 that locates the interchangeable tool 300 in position to hold the posture. The tool stocker 510 has an opening 512 at the center of the grounding portion 511. Legs 513 are provided on a surface of the grounding portion 511 opposite to an interchangeable tool 300 mount surface. The tool stocker 510 is fixed to the floor surface via the legs 513.

Figure 9:
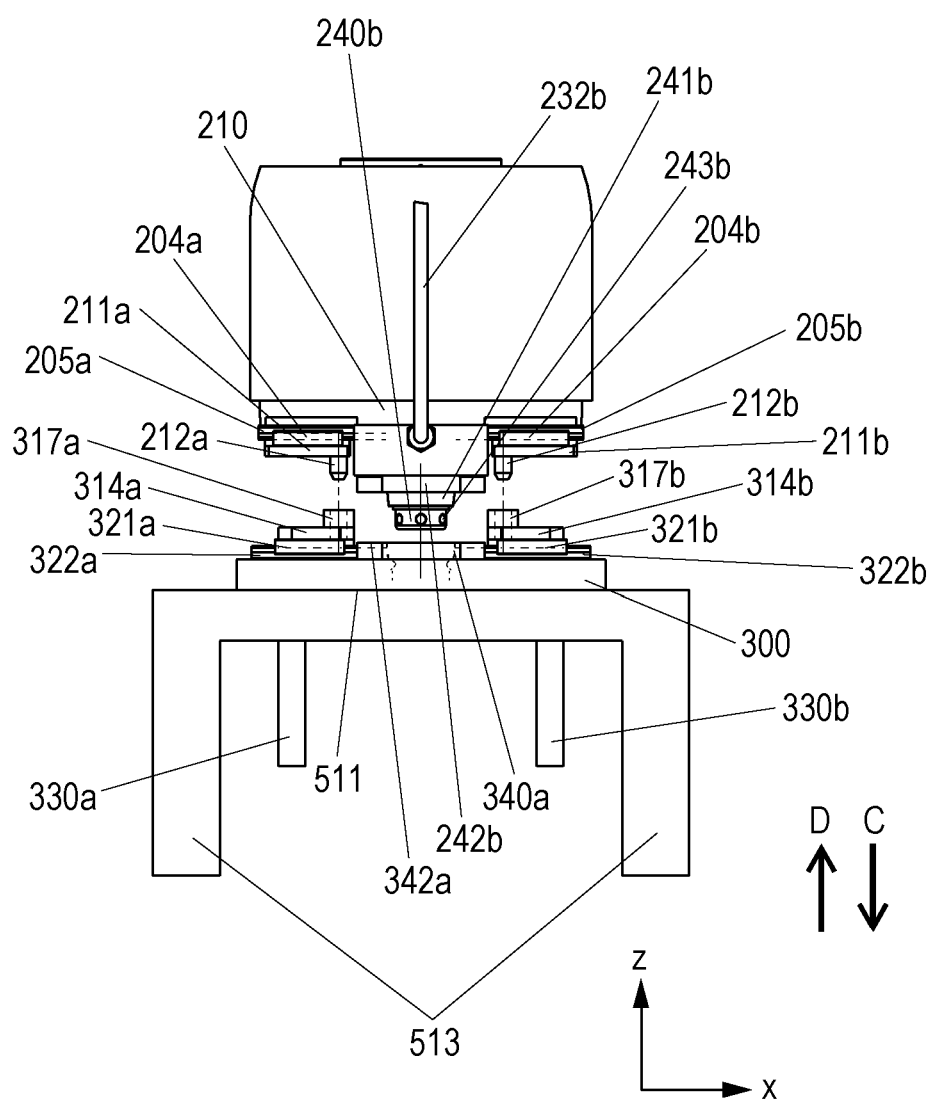
FIG. 9 is a plan view illustrating a state in which a robot-arm-side mount surface is approaching an interchangeable tool module to acquire the interchangeable tool module in an embodiment of the present disclosure.

FIG. 9 is a plan view illustrating a state in which the robot-arm-side mount surface 210 is approaching the interchangeable tool 300 to acquire the interchangeable tool 300 in the present embodiment. To acquired the interchangeable tool 300 from the tool stocker 510, the robot arm 100 is operated to move the robot-arm-side mount surface 210 to above the interchangeable tool 300 stored on the tool stocker 510, as illustrated in FIG. 9. Next, the robot-arm-side mount surface 210 is moved linearly in the direction of arrow C to come close to the interchangeable tool 300. At that time, the locator pins 240a and 240b are respectively inserted into the stepped fitting holes 340a and 340b, and the driving transmission members 212a and 212b are respectively inserted into the driving transmission holes 317a and 317b.

Figure 10:
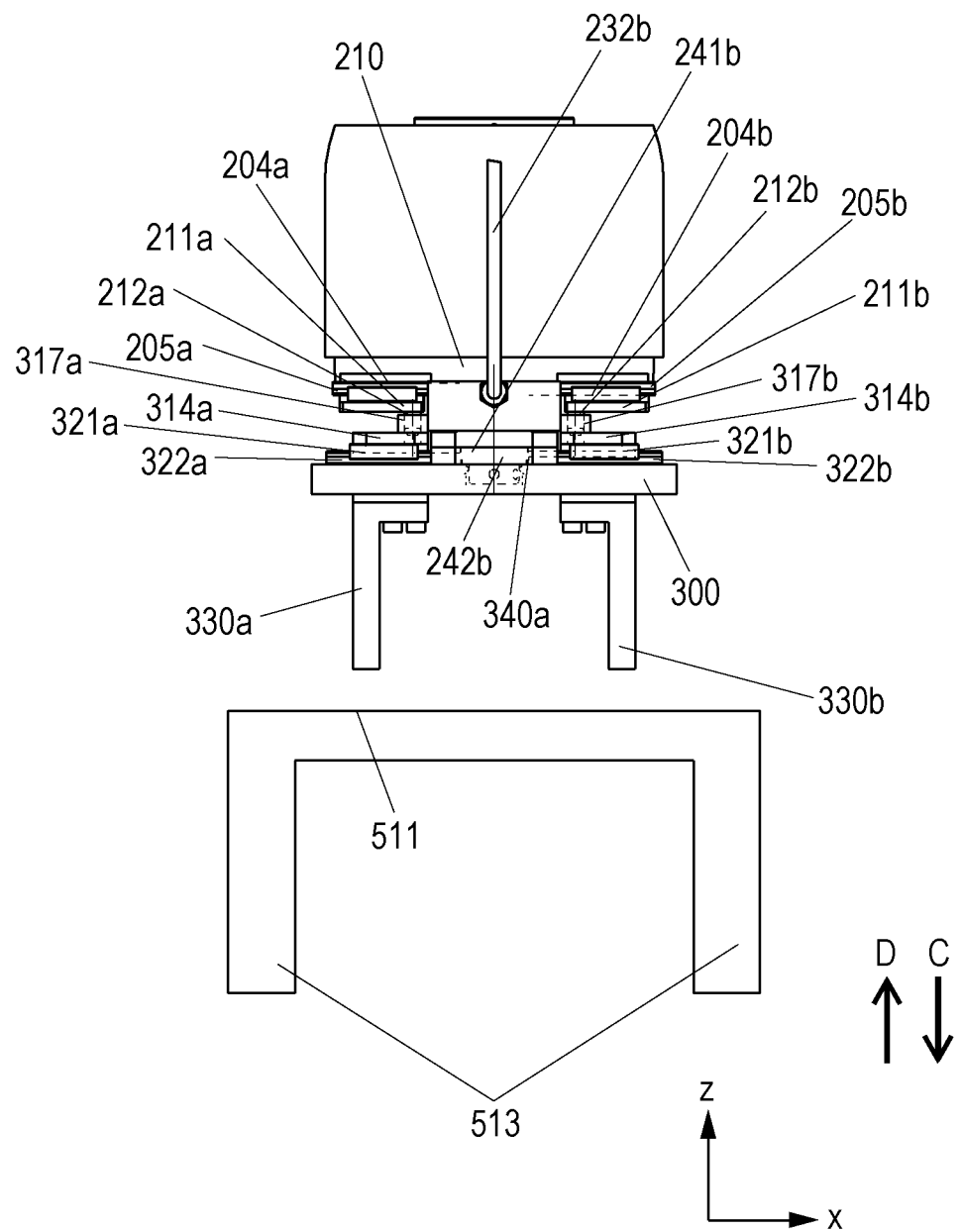
FIG. 10 is a plan view when an interchangeable tool module is acquired in an embodiment of the present disclosure.

FIG. 10 is a plan view when the interchangeable tool 300 is acquired in the present embodiment. The positioning of the interchangeable tool 300 is released, and the solenoid valve 521 is activated, with the locator pins 240a and 240b inserted in the stepped fitting holes 340a and 340b. The air in the attaching and detaching mechanism constituted by the locator pins 240a and 240b and the stepped fitting holes 340a and 340b is exhausted or supplied, so that the balls 243a and 243b are moved outward, and the interchangeable tool 300 is clamped on the robot-arm-side mount surface 210. Thereafter, by operating the robot arm 100, the interchangeable tool 300 moves in the direction of arrow D, and the operation for acquiring the interchangeable tool 300 from the tool stocker 510 is completed.

To store the interchangeable tool 300 in the tool stocker 510, the robot arm 100 is operated to move the interchangeable tool 300 to a predetermined position above the tool stocker 510. Next, the interchangeable tool 300 is moved in the direction of arrow C to insert the finger members 330a and 330b into the opening 512 into a predetermined position on the grounding portion 511.

In this state, the solenoid valve 521 is activated to supply or exhaust air to or from the attaching and detaching mechanism constituted by the locator pins 240a and 240b and the stepped fitting holes 340a and 340b. This causes the balls 243a and 243b to move inward, so that the clamping of the robot-arm-side mount surface 210 and the interchangeable tool 300 is released. Thus, only the interchangeable tool 300 is stored in the tool stocker 510.

Next, the interchanging system of the present embodiment will be described. As illustrated in FIG. 1, keep two or more interchangeable tools 300 ready. For example, suppose a case in which a workpiece Wa is taken out from a storage case (not shown) in which workpieces Wa and Wb with different shapes are stored and the workpiece W is moved from one position to another position. In that case, the robot arm 100 is controlled with the control unit 600 so that the robot-arm-side mount surface 210 is moved to above the tool stocker 510a to acquire the interchangeable tool 300a.

Thereafter, the robot arm 100 is controlled using the control unit 600 to move the robot-arm-side mount surface interchangeable tool 300a to above the storage case.

Next, the interchangeable tool 300a is moved downward toward the workpiece Wa to be gripped. The motor 221 is driven using the control unit 600 to drive the drive bases 211a and 211b, thereby respectively controlling the finger support members 314a and 314b and the finger members 330a and 330b via the driving transmission members 212a and 212b and the driving transmission holes 317a and 317b. Thus, the workpiece Wa is gripped. The interchangeable tool 300a is moved upward from the storage case, and the workpiece Wa is taken out. Thereafter, the robot arm 100 conveys the workpiece Wa to a target position, and releasing the gripping of the workpiece Wa by controlling the finger members 330a and 330b, so that the workpiece Wa is placed on the target position.

To grip the workpiece Wb, the robot arm 100 is controlled using the control unit 600 to move the interchangeable tool 300a to above the tool stocker 510a. The attaching and detaching mechanism constituted by the locator pins 240a and 240b and the stepped fitting holes 340a and 340b is activated, with the interchangeable tool 300a mounted in the tool stocker 510a. After the interchangeable tool 300a and the robot-arm-side mount surface 210 are unclamped from each other, the robot arm 100 is controlled with the control unit 600 so that the robot-arm-side mount surface 210 is moved upward from the tool stocker 510a. At that time, the interchangeable tool 300a is stored into the tool stocker 510a.

Next, the robot-arm-side mount surface 210 is moved to above the tool stocker 510b by controlling the robot arm 100 with the control unit 600. The interchangeable tool 300b is acquired as in the above. Next, the interchangeable tool 300b is move to above the storage case by controlling the robot arm 100 with the control unit 600.

Next, the target workpiece Wb is gripped by the interchangeable tool 300b, and the workpiece Wb is taken out, as is the workpiece Wa. The interchangeable tool 300b is moved to convey the workpiece Wb to a target position. The gripping of the workpiece Wb is released by controlling the finger members 330a and 330b to place the workpiece Wb at a target position.

Thus, in the robotic apparatus 20 including the interchangeable tool 300 of the present disclosure, the robot-arm-side mount surface 210 and the interchangeable-tool-side mount surface 311 have the same configuration. Furthermore, the robot arm 100 includes a driving source, such as a motor.

Therefore, there is no need for individual interchangeable tools 300 to have a driving source, such as a motor, and an electrical circuit for opening and closing the finger member 330, reducing cost and the size and weight of the entire robot hand. Furthermore, since the finger members 330 themselves are interchanged, the end effector 200 at the end of the robot arm 100 is not increased in size, unlike Japanese Patent No. 5892765.

Furthermore, since the finger member 300 can be opened and closed by the mechanical attaching and detaching mechanism, there is no need to seek the origin of the actuator for each interchanging operation caused by an electrical attaching and detaching mechanism. This facilitates repeated interchange only by remembering the operation of interchanging the interchangeable tool 300 with the control unit 600. Interchanging the interchangeable tool 300 allows operating a workpiece using a finger suitable for the shape of the workpiece, enhancing the versatility.

Furthermore, the robot-arm-side fixing portion and the driving mechanism, and the interchangeable-tool-side fixing portion and the opening and closing mechanism are each arranged in substantially perpendicular positions so that their occupied areas do not overlap on the mount surface. This decreases the length E out of the entire length F of the end effector 200, as illustrated in FIG. 6. Thus reducing the size and weight of the distal end of the robot arm 100 decreases the inertial force of the distal end, thereby reducing vibrations at the distal end of the interchangeable tool 300, facilitating control of the robot arm 100 for increasing the positioning accuracy for gripping the workpiece W.

The two interchangeable tools 300a and 300b and the two tool stockers 510a and 510b in the present embodiment are given for mere illustration. The number of interchangeable tools 300 can be increased according to the kind of tool corresponding to the shape and posture of the workpiece to be operated.

In the case of not only gripping but also painting or welding the workpiece W, the finger members 330a and 330b may be removed as appropriate and may be interchanged with another member according to the application.

The present embodiment has been described as applied to a ball-plunger configuration of the fixing portion between the robot-arm-side mount surface 210 and the interchangeable tool 300, in which the balls 243a and 243b are moved forward and backward by compressed air into engagement with the engaging portions 343a and 343b. Alternatively, it may be changed by the those skilled in the art to a configuration of connection using an electromagnet and a permanent magnet.

Figure 11:
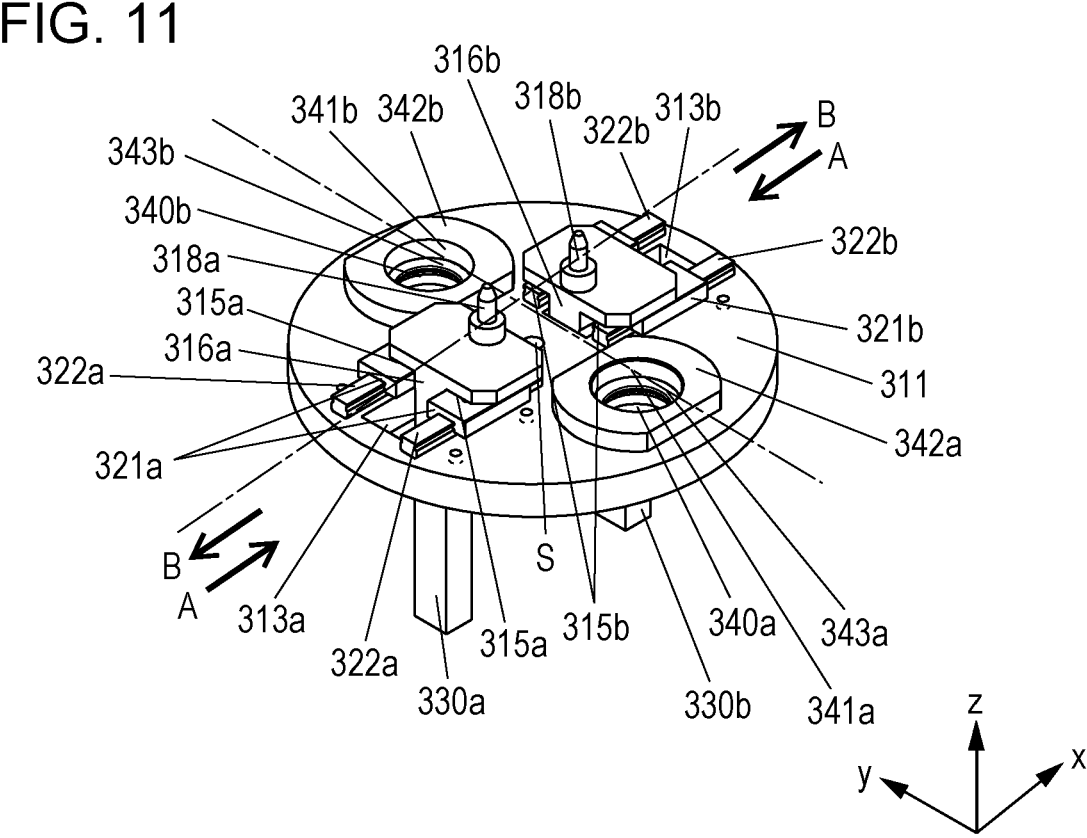
FIG. 11 is a perspective view of an interchangeable tool module having a driving transmission unit in an embodiment of the present disclosure viewed from above.
Figure 12:
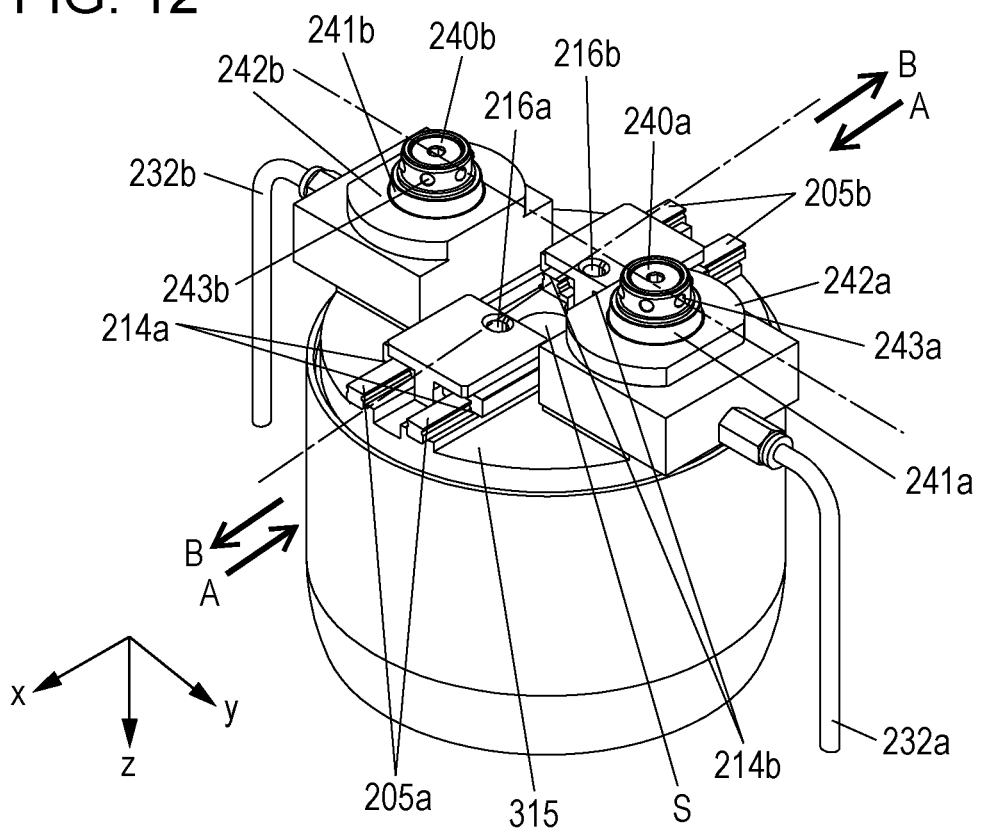
FIG. 12 is a perspective view of a driving module having a driving transmission unit in an embodiment of the present disclosure viewed from above.

Also a configuration in which driving transmission members are provided at the finger support members 318a and 318b, as illustrated in FIG. 11, and driving transmission holes are provided in the drive bases 216a and 216b, as illustrated in FIG. 12, has the same advantageous effects.

The present disclosure is applicable to industrial robots.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-056239 filed Mar. 22, 2017, which is hereby incorporated by reference herein in its entirety.

What is claimed is:

1. A robotic apparatus comprising a robot arm and configured to grip an object using an interchangeable tool that is attachable to and detachable from the robot arm,
the robot arm including
a driving mechanism that has a movable portion;
a transmission member disposed on or in the movable portion;
the interchangeable tool including
a finger portion;
a linked mechanism that is connected to the finger portion, the linked mechanism being connected to the movable portion and moving in link with the movable portion in a state in which the interchangeable tool is mounted to the robot arm; and
an engagement member disposed on or in the linked mechanism and configured to engage with the transmission member,
wherein the movable portion and the linked mechanism are connected by engagement of the transmission member with the engagement member.

2. The robotic apparatus according to claim 1,
wherein the robot arm has a robot-arm-side mount surface to which the interchangeable tool is mounted,
wherein the interchangeable tool has an interchangeable-tool-side mount surface to be mounted to the robot arm,
wherein the interchangeable tool is attached or detached by moving the robot-arm-side mount surface and the interchangeable-tool-side mount surface closer to each other or away from each other in one direction.

3. The robotic apparatus according to claim 2,
wherein the robot arm has a robot-arm-side fixing portion configured to hold the interchangeable tool in a mounted state,
wherein the interchangeable tool has an interchangeable-tool-side fixing portion to be engaged with the robot-arm-side fixing portion, and
wherein, in the mounted state, in which the interchangeable tool is mounted to the robot arm, a plane in which the robot-arm-side fixing portion, the interchangeable-tool-side fixing portion, the driving mechanism, and the linked mechanism are positioned is present between the robot-arm-side mount surface and the interchangeable-tool-side mount surface.

4. The robotic apparatus according to claim 3,
wherein the robot-arm-side fixing portion is provided as a pair of robot-arm-side fixing portions,
wherein the interchangeable-tool-side fixing portion is provided as a pair of interchangeable-tool-side fixing portions
wherein, on the robot-arm-side mount surface, the robot-arm-side fixing portion and the driving mechanism are disposed such that a direction in which the pair of robot-arm-side fixing portions is disposed and a direction in which the movable portion operates are substantially perpendicular to each other, and
wherein, on the interchangeable-tool-side mount surface, the interchangeable-tool-side fixing portion and the linked mechanism are disposed such that a direction in which the pair of interchangeable-tool-side fixing portions is disposed and a direction in which the linked mechanism operates are substantially perpendicular to each other.

5. The robotic apparatus according to claim 1,
wherein the transmission member is either one of a driving transmission pin and a driving transmission hole and the engagement member is an other of the driving transmission pin and the driving transmission hole.

6. The robotic apparatus according to claim 1, wherein the movable portion and the linked mechanism comprise a slide guide comprising a guide rail and a guide block.

7. The robotic apparatus according to claim 1,
wherein the robot arm has a robot-arm-side fixing portion configured to hold the interchangeable tool in a mounted state,
wherein the interchangeable tool has an interchangeable-tool-side fixing portion to be engaged with the robot-arm-side fixing portion,
wherein the robot-arm-side fixing portion and the interchangeable-tool-side fixing portion comprise a ball plunger that is able to be attached and detached by air.

8. The robotic apparatus according to claim 1,
wherein the movable portion is able to come close to each other and go away from each other.

9. The robotic apparatus according to claim 7,
wherein a ball that is able to be moved by the air is provided on the robot-arm-side fixing portion, and
wherein a fitting hole for engagement with the ball is provided on the interchangeable-tool-side fixing portion.

10. A method for manufacturing an article by using the robotic apparatus according to claim 1.

11. An interchangeable tool that is attachable to and detachable from a robot arm, the interchangeable tool comprising:
a finger portion;
a linked mechanism that is connected to the finger portion, the linked mechanism being connected to a movable portion of the robot arm and moving in link with the movable portion in a state in which the interchangeable tool is mounted to the robot arm; and
an engagement member disposed on or in the linked mechanism and configured to engage with a transmission member disposed on or in the movable portion,
wherein the movable portion and the linked mechanism are connected by engagement of the transmission member with the engagement member.

12. The interchangeable tool according to claim 11,
wherein the movable portion is able to come close to each other and go away from each other.

13. The interchangeable tool according to claim 11, further comprising:
an interchangeable-tool-side mount surface to be mounted to the robot arm;
wherein the interchangeable tool is attached or detached by moving a robot-arm-side mount surface of the robot arm and the interchangeable-tool-side mount surface closer to each other or away from each other in one direction.

14. The interchangeable tool according to claim 13, further comprising:
an interchangeable-tool-side fixing portion to be engaged with a robot-arm-side fixing portion of the robot arm configured to hold the interchangeable tool in a mounted state;
wherein, in the mounted state, in which the interchangeable tool is mounted to the robot arm, a plane in which the robot-arm-side fixing portion, the interchangeable-tool-side fixing portion, the driving mechanism, and the linked mechanism are positioned is present between the robot-arm-side mount surface and the interchangeable-tool-side mount surface.

15. The interchangeable tool according to claim 14,
wherein the interchangeable-tool-side fixing portion is provided as a pair of interchangeable-tool-side fixing portions,
wherein, on the interchangeable-tool-side mount surface, the interchangeable-tool-side fixing portion and the linked mechanism are disposed such that a direction in which the pair of interchangeable-tool-side fixing portions is disposed and a direction in which the linked mechanism operates are substantially perpendicular to each other.

16. The interchangeable tool according to claim 11,
wherein the transmission member is either one of a driving transmission pin and a driving transmission hole, and the engagement member is an other of the driving transmission pin and the driving transmission hole.

17. The interchangeable tool according to claim 11,
wherein the linked mechanism comprises a slide guide comprising a guide rail and a guide block.

18. The interchangeable tool according to claim 11, further comprising:
an interchangeable-tool-side fixing portion to be engaged with a robot-arm-side fixing portion of the robot arm configured to hold the interchangeable tool in a mounted state;
wherein the interchangeable-tool-side fixing portion comprises a ball plunger that is able to be attached and detached by air.

19. The interchangeable tool according to claim 18,
a fitting hole for engagement with a ball that is able to be moved by the air and is provided on the robot-arm-side fixing portion is provided on the interchangeable-tool-side fixing portion.

20. A method for controlling a robotic apparatus comprising a robot arm and configured to grip an object using an interchangeable tool that is attachable to and detachable from the robot arm,
the robot arm including
a driving mechanism that has a movable portion,
a transmission member disposed on or in the movable portion,
the interchangeable tool including
a finger portion, and
a linked mechanism that is connected to the finger portion, the linked mechanism being connected to the movable portion and moving in link with the movable portion in a state in which the interchangeable tool is mounted to the robot arm, and
an engagement member disposed on or in the linked mechanism and configured to engage with the transmission member,
wherein the movable portion and the linked mechanism are connected by engagement of the transmission member with the engagement member,
the method comprising:
controlling the driving mechanism by a control device configured to control the robot arm, thereby controlling the linked mechanism and controlling the finger portion.

21. The control method according to claim 20,
wherein the movable portion is able to come close to each other and go away from each other.

22. The control method according to claim 20,
wherein the robot arm has a robot-arm-side mount surface to which the interchangeable tool is mounted,
wherein the interchangeable tool has an interchangeable-tool-side mount surface to be mounted to the robot arm,
wherein the control device causes the robot-arm-side mount surface to move closer to or away from the interchangeable-tool-side mount surface in one direction, thereby attaching or detaching the interchangeable tool.

23. The control method according to claim 22,
wherein the robot arm has a robot-arm-side fixing portion configured to hold the interchangeable tool in a mounted state,
wherein the interchangeable tool has an interchangeable-tool-side fixing portion to be engaged with the robot-arm-side fixing portion, and
wherein the control device causes the robot-arm-side mount surface to move closer to or away from the interchangeable-tool-side mount surface in one direction to engage the robot-arm-side mount surface with the interchangeable-tool-side mount surface or disengage the robot-arm-side mount surface from the interchangeable-tool-side mount surface, thereby attaching or detaching the interchangeable tool.

24. The control method according to claim 23,
wherein the robot-arm-side fixing portion and the interchangeable-tool-side fixing portion comprise a ball plunger that is able to be attached and detached by air, and
wherein the control device engages the robot-arm-side mount surface with the interchangeable-tool-side mount surface by operating the ball plunger due to inflow of the air.

25. The control method according to claim 24,
wherein a driving transmission member is disposed at one of the movable portion and the linked mechanism, and a driving transmission hole is disposed at the other of the movable portion and the linked mechanism, and
wherein the movable portion and the linked portion are coupled to each other by fitting the driving transmission member into the driving transmission hole by the control device.

26. A non-transitory computer-readable storage medium storing a control program by which the control method according to claim 20 is executable.

27. A driving module with an interchangeable tool for gripping an object,
the interchangeable tool including
a finger portion; and
a linked mechanism connected to the finger portion;
an engagement member disposed on or in the linked mechanism;
the driving module comprising:
a movable portion configured to be, in a state in which the interchangeable tool is mounted to the driving module, connected to the linked mechanism so as to cause a linked operation of the linked mechanism; and
a transmission member disposed on or in the movable portion;
wherein the movable portion and the linked mechanism are connected by engagement of the transmission member with the engagement member.

28. A robot arm comprising the driving module according to claim 27.

29. The robotic apparatus according to claim 1,
wherein the robot arm has a robot-arm-side mount surface to which the driving mechanism is disposed,
wherein the interchangeable tool has an interchangeable-tool-side mount surface to which the linked mechanism is disposed,
wherein the transmission member is disposed on a first mount surface of the movable portion,
wherein the engagement member is disposed on a second mount surface of the linked mechanism,
wherein a length of the transmission member from the first mount surface and a length of the engagement member from the second mount surface are less than an interval between the robot-arm-side mount surface and the interchangeable-tool-side mount surface in a state in which the interchangeable tool is mounted to the robot arm.

30. The robotic apparatus according to claim 2,
wherein the robot arm has a robot-arm-side fixing portion configured to hold the interchangeable tool in a mounted state,
wherein a length of the transmission member from the mount surface is less than a length of the robot-arm-side fixing portion from the robot-arm-side mount surface on which the robot-arm-side fixing portion is provided.

31. A robotic apparatus comprising a robot arm and configured to grip an object using an interchangeable tool that is attachable to and detachable from the robot arm,
the robot arm including
a driving mechanism that has a movable portion; and
a driving transmission member disposed on the movable portion;
the interchangeable tool including
a finger portion; and
a linked mechanism that is connected to the finger portion, the linked mechanism being connected to the movable portion and moving in link with the movable portion in a state in which the interchangeable tool is mounted to the robot arm; and
a driving transmission hole disposed at an upper portion of the linked mechanism,
wherein the movable portion and the linked mechanism are connected by insertion of the driving transmission member into the driving transmission hole.

32. A robotic apparatus comprising a robot arm and configured to grip an object using an interchangeable tool that is attachable to and detachable from the robot arm,
the robot arm including
a driving mechanism that has a movable portion; and
a driving transmission hole disposed at an upper portion of the movable portion;
the interchangeable tool including
a finger portion; and
a linked mechanism that is connected to the finger portion, the linked mechanism being connected to the movable portion and moving in link with the movable portion in a state in which the interchangeable tool is mounted to the robot arm;
a driving transmission member disposed on the linked mechanism,
wherein the movable portion and the linked mechanism are connected by insertion of the driving transmission member into the driving transmission hole.

* * * * *